(12) United States Patent
Wang

(10) Patent No.: US 11,131,801 B2
(45) Date of Patent: Sep. 28, 2021

(54) BACKLIGHT ASSEMBLY, BACKLIGHT UNIT AND DISPLAY PANEL

(71) Applicants: Beijing BOE Optoelectronics Technology Co., Ltd., Beijing (CN); BOE Technology Group Co., Ltd., Beijing (CN)

(72) Inventor: Shipeng Wang, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/916,528

(22) Filed: Jun. 30, 2020

(65) Prior Publication Data

US 2021/0157046 A1    May 27, 2021

(30) Foreign Application Priority Data

Nov. 22, 2019  (CN) .......................... 201911157763.6

(51) Int. Cl.
*F21V 8/00* (2006.01)
*G02F 1/1333* (2006.01)

(52) U.S. Cl.
CPC .......... *G02B 6/0085* (2013.01); *G02B 6/009* (2013.01); *G02F 1/133308* (2013.01); *G02F 1/13332* (2021.01); *G02F 1/133314* (2021.01)

(58) Field of Classification Search
CPC .... G02B 6/0085; G02B 6/009; G02B 6/0081; G02B 6/0086; G02F 1/133308; G02F 1/133608; G02F 2001/13332; G02F 2001/133314; G02F 2001/133317; G02F 2201/503; G02F 1/13332; G02F 1/133314; G02F 1/133317
See application file for complete search history.

(56) References Cited

U.S. PATENT DOCUMENTS

| 2005/0185110 | A1* | 8/2005 | Lai | G02F 1/133308 349/58 |
| 2012/0287672 | A1* | 11/2012 | Lee | G02F 1/133608 362/609 |
| 2013/0021780 | A1* | 1/2013 | Jung | G02B 6/0088 362/97.1 |
| 2013/0155335 | A1* | 6/2013 | Yoshikawa | G02B 6/0088 348/790 |

(Continued)

*Primary Examiner* — Jong-Suk (James) Lee
*Assistant Examiner* — James M Endo
(74) *Attorney, Agent, or Firm* — Nath, Goldberg & Meyer; Joshua B. Goldberg

(57) ABSTRACT

A backlight assembly, a backlight unit, and a display panel are provided. The backlight assembly includes a back plate, a light source plate, at least one buffer member, and at least one heat dissipation component. The back plate is on a side of the light source plate distal to a light exit side thereof, both the at least one buffer member and the at least one heat dissipation component are between the back plate and the light source plate, the heat dissipation component extends from a side of the buffer member proximal to the light source plate to a side of the buffer member proximal to the back plate, and the surfaces, which are in contact with each other, of two ones of each heat dissipation member, each buffer member, the back plate and the light source plate, are fixed to each other.

20 Claims, 3 Drawing Sheets

(56) References Cited

U.S. PATENT DOCUMENTS

| | | | | |
|---|---|---|---|---|
| 2014/0036536 | A1* | 2/2014 | Gettemy | G02B 26/02 |
| | | | | 362/612 |
| 2014/0226073 | A1* | 8/2014 | Kamada | G02B 6/0085 |
| | | | | 348/725 |
| 2014/0320747 | A1* | 10/2014 | Kamada | G02B 6/0088 |
| | | | | 348/725 |
| 2015/0185407 | A1* | 7/2015 | Lv | G02B 6/0085 |
| | | | | 362/611 |
| 2015/0205036 | A1* | 7/2015 | Shimizu | G02B 6/0086 |
| | | | | 348/790 |
| 2016/0011364 | A1* | 1/2016 | Horiguchi | G02B 6/0088 |
| | | | | 362/606 |
| 2016/0131831 | A1* | 5/2016 | Tomomasa | H04N 9/3141 |
| | | | | 348/790 |
| 2017/0131463 | A1* | 5/2017 | Horiguchi | G02B 6/0085 |
| 2017/0139102 | A1* | 5/2017 | Fu | G02F 1/133308 |
| 2018/0284338 | A1* | 10/2018 | Wang | G02B 6/0043 |

* cited by examiner

BACKLIGHT ASSEMBLY, BACKLIGHT UNIT AND DISPLAY PANEL

CROSS-REFERENCE TO RELATED APPLICATIONS

This application claims the priority of Chinese Patent Application No. 201911157763.6, filed on Nov. 22, 2019, in the Chinese Intellectual Property Office, the contents of which are incorporated herein in their entirety by reference.

TECHNICAL FIELD

The present disclosure relates to the field of display technology, and particularly relates to a backlight assembly, a backlight unit and a display panel.

BACKGROUND

A Mini LED (Mini Light Emitting Diode) (also called sub-millimeter Light Emitting Diode) display is a new display technology in recent years, and has certain advantages over conventional LCD (liquid Crystal display) and OLED (Organic Light-Emitting Diode) display (which may also be referred to as an organic electroluminescent display). With the development of the Mini LED, an issue of heat dissipation is becoming a focus of research.

SUMMARY

According to an aspect of the present disclosure, a backlight assembly is provided, which includes: a back plate and a light source plate, wherein the back plate is provided on a side of the light source plate distal to a light exit side of the light source plate, and the backlight assembly further includes at least one buffer member between the back plate and the light source plate, wherein the backlight assembly further includes at least one heat dissipation member between the back plate and the light source plate, and the at least one heat dissipation member extends from a side of the at least one buffer member proximal to the light source plate to a side of the at least one buffer member proximal to the back plate, and the surfaces, which are in contact with each other, of each of the at least one heat dissipation member, each of the at least one buffer member, the back plate and the light source plate, are fixed to each other.

In some embodiments, the at least one buffer member includes a plurality of buffer members arranged in an array at an equal interval, and the at least one heat dissipation member includes a plurality of heat dissipation members; at least one buffer member adjacent to each other is taken as a group of buffer members in a row or column direction of the plurality of buffer members, and each of the plurality of heat dissipation members extends from a side of one group of buffer members proximal to the light source plate to a side of an adjacent group of buffer members proximal to the back plate via a space between the one group of buffer members and the adjacent group of buffer members.

In some embodiments, the group of buffer members includes one buffer member.

In some embodiments, the at least one buffer member includes a plurality of buffer members arranged in an array at an equal interval, the at least one heat dissipation member includes a plurality of heat dissipation members in one-to-one correspondence with the plurality of buffer members, and each of the plurality of heat dissipation members extends from a side of a corresponding buffer member proximal to the light source plate to a side of the corresponding buffer member proximal to the back plate along an edge of the corresponding buffer member.

In some embodiments, orthographic projections of the plurality of heat dissipation members on the light source plate completely cover the light source plate.

In some embodiments, each of the heat dissipation members includes a graphite sheet.

In some embodiments, each of the buffer members includes foam.

In some embodiments, a light source on the light source plate includes a Mini LED.

In some embodiments, surfaces, which are in contact with each other, of two ones of each of the heat dissipation members, each of the buffer members, the back plate and the light source plate, are fixed to each other by an adhesive.

In some embodiments, an adhesive is provided on a surface of each of the buffer members in contact with the light source plate, a surface of each of the buffer members in contact with the back plate, and a surface of each of the buffer members in contact with each of the heat dissipation members; and an adhesive is provided on a surface of each of the heat dissipation members in contact with the light source plate, and a surface of each of the heat dissipation members in contact with the back plate.

In some embodiments, at least one heat dissipation fin is provided on a side of the back plate distal to the light source plate.

In some embodiments, the at least one heat dissipation fin comprises a plurality of heat dissipation fins on a surface of the back plate, the plurality of heat dissipation fins are in parallel with each other and have an equal interval therebetween, and extend in a direction perpendicular to the surface of the back plate.

In some embodiments, the plurality of heat dissipation fins and the back plate are formed as a one-piece structure.

In some embodiments, the back plate has a U-shape, and the light source plate, the at least one buffer member and the at least one heat dissipation member are in a U-shaped space of the back plate.

According to an aspect of the present disclosure, a backlight unit is provided, which includes the backlight assembly in any one of the embodiments above and a light adjusting layer on a light exit side of the light source plate in the backlight assembly, wherein the light adjusting layer is for adjusting the light emitted from the light source plate.

In some embodiments, the light adjusting layer includes: a light guide plate on the light exit side of the light source plate; a diffuser sheet on a side of the light guide plate distal to the light source plate; a quantum dot film on a side of the diffuser sheet distal to the light guide plate; and a prism on a side of the quantum dot film distal to the diffuser sheet.

According to an aspect of the present disclosure, a display panel is provided, which includes the backlight unit above and a driving circuit for driving the backlight unit.

In some embodiments, the display panel further includes a display substrate on a light exit side of the backlight unit.

In some embodiments, the display panel further includes a protection frame at both sides of a U-shaped opening of the back plate having a U-shape, to fix the back plate and the display substrate.

In some embodiments, the display panel is a liquid crystal display panel.

DETAILED DESCRIPTION

In order to make one of ordinary skill in the art better understand the technical solutions of the present disclosure, the backlight assembly, the backlight unit and the display panel of the present disclosure are described in further detail below with reference to the accompanying drawings and exemplary embodiments.

In both a Mini LED backlight unit and a Mini LED display module, for a current conventional Mini LED design, a method for improving the heat dissipation capability mainly adopts active heat dissipation components such as fans and the like which need power to dissipate heat of the Mini LED. These heat dissipation schemes increase the power consumption of a system and need replacement of consumable (e.g., the fans), etc., and the improvement of the heat dissipation capability is also limited.

Figure 1:
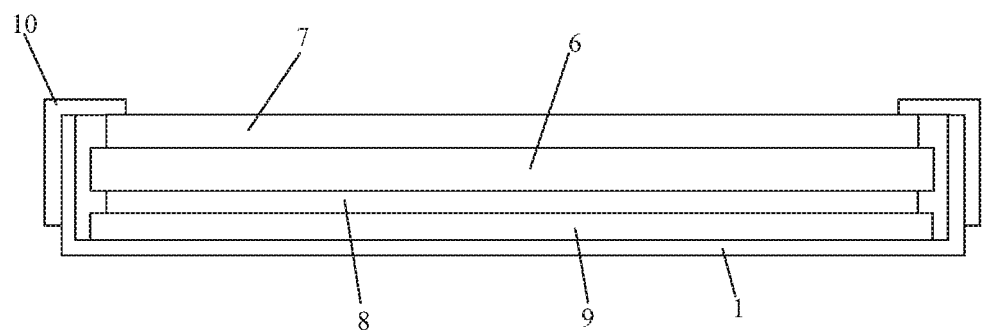
FIG. 1 is a sectional view showing a structure of a liquid crystal display module according to an embodiment of the present disclosure.
Figure 9:
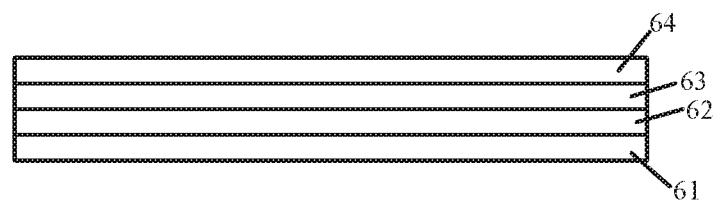
FIG. 9 is a sectional view showing a structure of a light adjusting layer according to an embodiment of the present disclosure.

A Mini LED (sub-millimeter light emitting diode) module according to an embodiment of the present disclosure is shown in FIG. 1, and the Mini LED module serves as a backlight unit in a liquid crystal display module. A liquid crystal panel (i.e., a display substrate) 7 in the liquid crystal display module functions as a general liquid crystal display panel. A light adjusting layer 6 includes a light guide plate 61, a diffuser sheet 62, a quantum dot film 63, a prism 64 (as shown in FIG. 9), and the like. The light adjusting layer 6 is used to adjust light emitted from the Mini LED lamp plate 8 in the backlight unit below. When the Mini LED lamp plate 8 displays, the Mini LED lamp plate 8 consumes power and the Mini LED lamp plate 8 become a heat source of the whole display module. The Mini LED lamp plate 8 and a back plate 1 of the backlight unit are fixed through a double-sided foam rubber 9. The double-sided foam rubber 9 can also play a role in buffering vibration, and avoids the defects such as fracture of the lamp plate, breakage of a chip due to vibration of the Mini LED lamp plate 8. A protection frame 10 (which may be made of metal, such as iron) is provided outside the back plate 1. The protection frame 10 fixes the back plate 1 and the liquid crystal panel 7, and provides protection for the back plate 1 and the liquid crystal panel 7.

In the Mini LED (sub-millimeter light emitting diode) module of the embodiment, the heat from the Mini LED lamp plate 8, as the heat source after the Mini LED lamp plate 8 is powered on, can be conducted to the back plate 1 via the foam rubber 9 at first. The current conventional foam rubber 9 has a low coefficient of heat conduction, and thus it may be difficult to dissipate heat effectively through the back plate 1, probably leading to an over high temperature of the Mini LED module.

Figure 2:
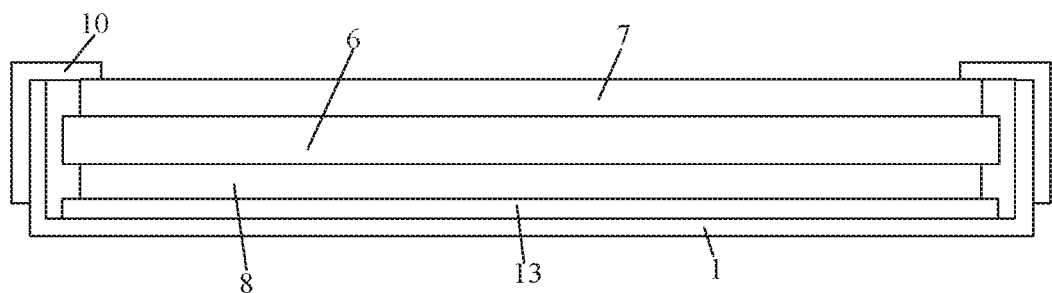
FIG. 2 is a sectional view showing a structure of a liquid crystal display module according to an embodiment of the present disclosure.

FIG. 2 is a Mini LED module for enhancing heat dissipation according to an embodiment of the present disclosure, in which a layer of graphite sheet 13 is used to replace the double-sided foam rubber in FIG. 1 to fix the Mini LED lamp plate 8, so as to improve heat dissipation performance. A drawback of this solution is that the graphite sheet 13 is a rigid material and does not function to absorb vibration. The Mini LED lamp plate 8 (especially a glass-based Mini LED lamp plate) is prone to problems such as fracture of a lamp plate, breakage of a chip and the like during a drop vibration test.

Figure 3:
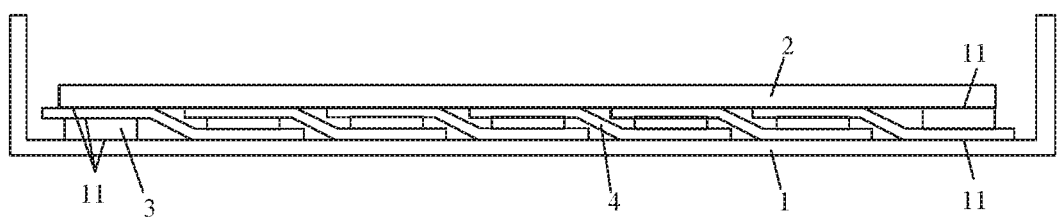
FIG. 3 is a sectional view showing a structure of a backlight assembly according to an embodiment of the present disclosure.

According to an aspect of the present disclosure, there is provided a backlight assembly. As shown in FIG. 3, the backlight assembly includes: a back plate 1 and a light source plate 2. The back plate 1 is on a side of the light source plate 2 distal to a light exit side of the light source plate 2. The backlight assembly further includes at least one buffer member (which may also be referred to as a shock absorber) 3, and the buffer member 3 is provided between the back plate 1 and the light source plate 2. The backlight assembly further includes at least one heat dissipation member 4 between the back plate 1 and the light source plate 2. The heat dissipation member 4 extends from a side of the buffer member 3 proximal to the light source plate 2 to a side of the buffer member 3 proximal to the back plate 1. The surfaces, which are in contact with each other, of two ones of the heat dissipation member 4, the buffer member 3, the back plate 1 and the light source plate 2 are fixed to each other. For example, both ends of each heat dissipation member 4 may be in contact with the light source plate 2 and the back plate 1, respectively.

For example, the back plate 1 is made of a material (e.g., a metal such as copper, aluminum, iron, etc.) capable of dissipating heat well, so that heat inside the backlight assembly is effectively dissipated through the back plate 1. As shown in FIG. 3, the back plate 1 is U-shaped, and the light source plate 2, the at least one buffer member 3 and the at least one heat dissipation member 4 are provided in a U-shaped space of the back plate 1.

The heat dissipation member 4 is arranged to extend from the side of the buffer member 3 proximal to the light source plate 2 to the side of the buffer member 3 proximal to the back plate 1, so that the heat generated by the light source plate 2 when the light source plate 2 provides the backlight, can be effectively conducted to the back plate 1 through the heat dissipation member 4, so as to avoid using an active heat dissipation member such as a fan to dissipate heat from the light source plate 2, thereby reducing power consumption of the backlight assembly and saving consumables of the backlight assembly. At the same time, the heat dissipation capacity of the backlight assembly is further improved. In addition, the arrangement of the buffer member 3 can buffer the vibration, so that the backlight assembly will not break after being subject to vibration.

Figure 4:
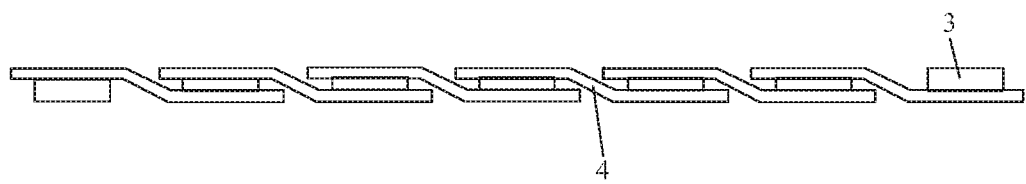
FIG. 4 is a sectional view showing structures of a buffer member and a heat dissipation member according to an embodiment of the present disclosure.

In the embodiment, as shown in FIG. 4, the at least one buffer member 3 may include a plurality of buffer members 3 arranged in an array at an equal interval. The at least one heat dissipation member 4 includes a plurality of heat dissipation members. At least one buffer member 3 adjacent to each other is taken as a group of buffer members 3 in a row or column direction of the plurality of buffer members 3, and each of the heat dissipation members 4 extends from a side of one group of buffer members 3 proximal to the light source plate to a side of an adjacent group (i.e., a group adjacent to the one group) of buffer members 3 proximal to the back plate 1 via a space between the one group of buffer members and the adjacent group of buffer members. As shown in FIG. 4, the number of the buffer members 3 in each group of buffer members is one. Thus, each heat dissipation member 4 extends from a side of a preceding buffer member 3 proximal to the light source plate 2 to a side of a succeeding buffer member 3 proximal to the back plate 1. In such way, in a case that the buffer member 3 is ensured to effectively absorb a vibration of the backlight assembly when the backlight assembly is subject to the vibration, when the light source plate 2 provides the backlight, the heat dissipation member 4 can also conduct the heat from the light source plate 2 to the back plate 1 effectively, and the heat is dissipated through the back plate 1, thereby greatly promoting the heat dissipation of the backlight unit. Compared with the traditional way of using active dissipation components such as fans to dissipate heat, the backlight assembly according to the present embodiment can also reduce heat dissipation power consumption and save cost for heat dissipation.

Figure 7:
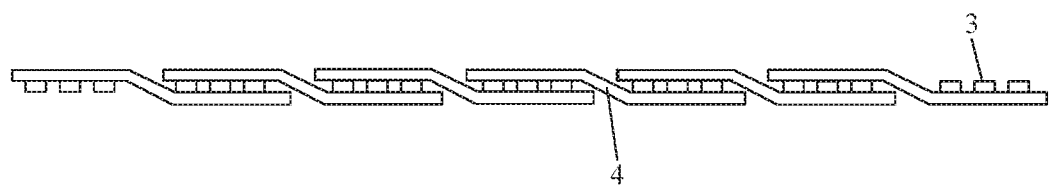
FIG. 7 is a sectional view showing a structure of a backlight assembly according to an embodiment of the present disclosure.

Optionally, there may be a plurality of buffer members in each group of buffer members 3, and as shown in FIG. 7, the number of the buffer members in each group of buffer members may be three.

Figure 8:
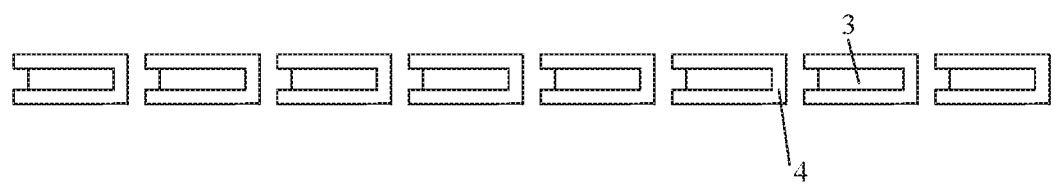
FIG. 8 is a sectional view showing a structure of a backlight assembly according to an embodiment of the present disclosure.

Optionally, as shown in FIG. 8, the at least one heat dissipation member 4 includes a plurality of heat dissipation members in one-to-one correspondence with the plurality of buffer members 3. Each of the plurality of heat dissipation members 4 extends from a side of a corresponding buffer member 3 proximal to the light source plate 2 to a side of the corresponding buffer member 3 proximal to the back plate 1 along an edge of the corresponding buffer member 3.

Optionally, in the present embodiment, orthographic projections of all the heat dissipation members 4 on the light source plate 2 completely cover the light source plate 2. In this way, a contact area of the heat dissipation members 4 and the light source plate 2 can be increased, thereby better conducting heat from the light source plate 2 to the back plate 1 and then dissipating the heat via the back plate 1 when the light source plate 2 provides the backlight.

Further optionally, in the present embodiment, each of the heat dissipation members 4 includes a graphite sheet. A plurality of layers of the graphite sheets can be stacked on top of each other, so that the heat can be better conducted and the heat dissipation efficiency can be improved. Each of the buffer members 3 includes foam. The light sources on the light source plate 2 include sub-millimeter light emitting diodes (i.e. Mini LEDs). Of course, each of the heat dissipation members 4 is not limited to a graphite sheet, and other materials having good heat dissipation properties (for example, metals such as copper, aluminum, silver, etc.) can be used as the heat dissipation member. Each of the buffer members 3 is not limited to foam. The light sources are not limited to sub-millimeter light emitting diodes, and other light sources such as LED light sources, OLED light sources, and ordinary white light source lamps are within the scope of the present disclosure.

In the present embodiment, an adhesive is provided on the surfaces of the buffer members 3 in contact with the light source plate 2, the surfaces of the buffer members 3 in contact with the back plate 1, and the surfaces of the buffer members 3 in contact with the heat dissipation members 4 (as shown in FIG. 3). The light source plate 2, the buffer members 3, the heat dissipation members 4, and the back plate 1 may be bonded together by the adhesive 11. The adhesive 11 can firmly fix the components in the backlight assembly together.

Figure 5:
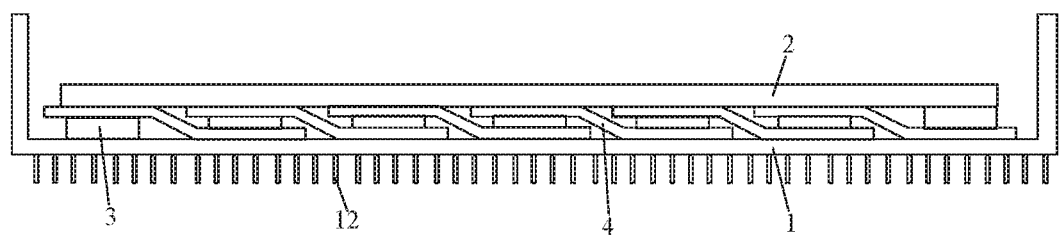
FIG. 5 is a sectional view showing a structure of a backlight assembly according to an embodiment of the present disclosure.

Further optionally, as shown in FIG. 5, on the basis of the backlight assembly shown in FIG. 3, the back plate 1 further includes at least one heat dissipation fin 12 on a side of the back plate 1 distal to the light source plate 2.

For example, the heat dissipation fins 12 are made of a same material as the back plate 1, which is capable of dissipating heat effectively. The heat dissipation fins 12 can increase the surface area of the back plate 1, so that the back plate 1 can better dissipate heat generated when the light source plate 2 provides backlight, and the heat dissipation efficiency of the backlight assembly is improved.

Optionally, the at least one heat dissipation fin 12 includes a plurality of heat dissipation fins 12. The plurality of heat dissipation fins 12 are parallel to each other and are on the surface (for example, the lower surface shown in FIG. 5) of the back plate 1. The heat dissipation fins 12 extend along a direction perpendicular to the surface of the back plate 1. The heat dissipation fins 12 have a certain height in the direction perpendicular to the back plate 1, which is beneficial to efficient heat dissipation.

In the embodiment, the heat dissipation fins 12 are integrally formed with the back plate 1. In this way, the heat dissipation can be further promoted, and the heat dissipation efficiency can be improved.

In the backlight assembly provided by any one of the embodiments shown in FIGS. 3 to 5 and FIGS. 7 and 8 of the present disclosure, the heat dissipation member extends from a side of the buffer member proximal to the light source plate to a side of the buffer member proximal to the back plate, so that the heat generated by the light source plate when the light source plate provides backlight, can be effectively conducted to the back plate through the heat dissipation member, so as to avoid using an active heat dissipation member such as a fan to dissipate heat from the light source plate, thereby reducing power consumption of the backlight assembly and saving consumables of the backlight assembly. At the same time, the heat dissipation capacity of the backlight assembly is further improved. In addition, the buffer member can buffer a vibration, so that the backlight assembly will not break after being subject to the vibration.

According to another aspect of the present disclosure, a backlight unit is further provided. The backlight unit includes a light adjusting layer and the above-described backlight assembly. The light adjusting layer is on a light exit side of the light source plate of the backlight assembly, and is configured to adjust light emitted from the light source plate.

As shown in FIG. 9, the light adjusting layer 6 includes a light guide plate 61, a diffuser sheet 62, a quantum dot film 63, a prism 64, and the like, which are stacked on one another. The light guide plate 61 is on the light exit side of the light source plate. The diffuser sheet 62 is on a side of the light guide plate distal to the light source plate 2. The quantum dot film 63 is on a side of the diffuser sheet 62 distal to the light guide plate 61. The prism 64 is on a side of the quantum dot film 63 distal to the diffuser sheet 62. The light adjusting layer 6 may be a conventional film layer and structure, and will not be described in detail here.

The heat dissipation capability of the backlight unit can be further improved by adopting the above backlight assembly, the power consumption for the heat dissipation of the backlight unit can also be reduced, and consumables for heat dissipation of the backlight unit can be saved.

In the embodiment, when each light source on the light source plate is a Mini LED, an LED or an OLED, the backlight unit can be directly used as a display panel, or the backlight unit can also be used as a backlight unit of a liquid crystal display panel.

Figure 6:
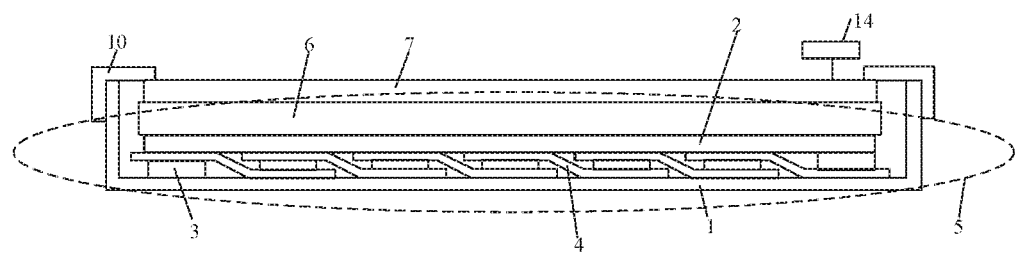
FIG. 6 is a sectional view showing a structure of a display panel according to an embodiment of the present disclosure.

According to an aspect of the present disclosure, a display panel is provided. As shown in FIG. 6, the display panel includes the above backlight unit and a driving circuit 14 for driving the backlight unit. For example, the driving circuit 14 may be coupled to the light source plate 2 of the backlight unit. In the present embodiment, the display panel may be a liquid crystal display panel, and the display panel further includes a display substrate 7 on the light exit side of the backlight unit. For example, the display substrate 7 is on the light exit side of the light adjusting layer 6 in the backlight unit 5. The light adjusting layer 6 is used for adjusting the backlight, so that the adjusted backlight is used as the backlight for display of the display substrate 7. The display substrate 7 may be a known liquid crystal display substrate. The display substrate 7 may be coupled to the driving circuit 14, and the driving circuit 14 may also be used to drive the display substrate 7 to achieve a normal display function. The driving circuit 14 may be a known driving circuit or driver.

In the embodiment, a protection frame 10 is provided outside the back plate 1. The protection frame 10 fixes the back plate 1 and the display substrate 7 to connect them together and protect them. The protection frame 10 may be provided on two sides of the U-shaped opening of the U-shaped back plate to fix the back plate 1 and the display substrate 7. The protection frame 10 may be made of iron or the like.

The heat dissipation capability of the display panel can be further improved by adopting the backlight assembly in any one the embodiments of FIGS. 3 to 5 and FIGS. 7 to 8, the power consumption for the heat dissipation of the display panel can also be reduced, and consumables for heat dissipation of the display panel can be saved.

The display panel provided by the present disclosure may be any product or component having a display function, such as an LCD panel, an LCD television, a Mini LED panel, a Mini LED television, an OLED panel, an OLED television, a display, a mobile phone, a navigator, and the like.

It will be understood that the above embodiments are merely exemplary embodiments employed to explain the principles of the present disclosure, and the present disclosure is not limited thereto. It will be apparent to one of ordinary skill in the art that various changes and modifications can be made therein without departing from the spirit and scope of the present disclosure, and these changes and modifications are to be considered within the scope of the present disclosure.

What is claimed is:

1. A backlight assembly, comprising: a back plate and a light source plate, wherein the back plate is on a side of the light source plate distal to a light exit side of the light source plate, and the backlight assembly further comprises at least one buffer member between the back plate and the light source plate, wherein the backlight assembly further comprises at least one heat dissipation member between the back plate and the light source plate, and the at least one heat dissipation member extends from a side of the at least one buffer member proximal to the light source plate to a side of the at least one buffer member proximal to the back plate, and surfaces, which are in contact with each other, of each of the at least one heat dissipation member, each of the at least one buffer member, the back plate and the light source plate, are fixed to each other, wherein the at least one buffer member comprises a plurality of buffer members arranged in an array at an equal interval, and the at least one heat dissipation member comprises a plurality of heat dissipation members; and at least one buffer member adjacent to each other is taken as a group of buffer members in a row or column direction of the plurality of buffer members, and each of the plurality of heat dissipation members extends from a side of one group of buffer members proximal to the light source plate to a side of an adjacent group of buffer members proximal to the back plate via a space between one group of buffer members and the adjacent group of buffer members.

2. The backlight assembly of claim 1, wherein the group of buffer members comprises one buffer member.

3. The backlight assembly of claim 2, wherein orthographic projections of the plurality of heat dissipation members on the light source plate completely cover the light source plate.

4. The backlight assembly of claim 3, wherein each of the heat dissipation members comprises a graphite sheet.

5. The backlight assembly of claim 4, wherein each of the buffer members comprises foam.

6. The backlight assembly of claim 5, wherein surfaces, which are in contact with each other, of two ones of each of the heat dissipation members, each of the buffer members, the back plate and the light source plate, are fixed to each other by an adhesive.

7. The backlight assembly of claim 5, wherein an adhesive is provided on a surface of each of the buffer members in contact with the light source plate, a surface of each of the buffer members in contact with the back plate, and a surface of each of the buffer members in contact with each of the heat dissipation members; and an adhesive is provided on a surface of each of the heat dissipation members in contact with the light source plate, and a surface of each of the heat dissipation members in contact with the back plate.

8. The backlight assembly of claim 7, wherein at least one heat dissipation fin is provided on a side of the back plate distal to the light source plate.

9. The backlight assembly of claim 8, wherein the at least one heat dissipation fin comprises a plurality of heat dissipation fins on a surface of the back plate, the plurality of heat dissipation fins are in parallel with each other and have an equal interval therebetween, and extend in a direction perpendicular to the surface of the back plate.

10. The backlight assembly of claim 9, wherein the plurality of heat dissipation fins and the back plate are formed as a one-piece structure.

11. The backlight assembly of claim 10, wherein the back plate has a U-shape, and the light source plate, the at least one buffer member and the at least one heat dissipation member are in a U-shaped space of the back plate.

12. The backlight assembly of claim 1, wherein a light source on the light source plate comprises a Mini LED.

13. A backlight assembly, comprising: a back plate and a light source plate, wherein the back plate is on a side of the light source plate distal to a light exit side of the light source plate, and the backlight assembly further comprises at least one buffer member between the back plate and the light source plate, wherein the backlight assembly further comprises at least one heat dissipation member between the back plate and the light source plate, and the at least one head dissipation member extends from a side of the at least one buffer member proximal to the light source plate to a side of the at least one buffer member proximal to the back plate, and surfaces, which are in contact with each other, of each of the least one heat dissipation member, each of the at least one buffer member, the back plate and the light source plate, are fixed to each other, wherein the at least one buffer member comprises a plurality of buffer members arranged in an array at an equal interval, the at least one heat dissipation member comprises a plurality of heat dissipation members in one-to-one correspondence with the plurality of buffer members, and each of the plurality of heat dissipation members extends from a side of a corresponding buffer member proximal to the light source plate to a side of the corresponding buffer member proximal to the back plate along an edge of the corresponding buffer member.

14. A backlight unit, comprising the backlight assembly of claim 1 and a light adjusting layer on the light exit side of the light source plate in the backlight assembly, wherein the light adjusting layer is for adjusting light emitted from the light source plate.

15. The backlight unit of claim 14, wherein the light adjusting layer comprises:
   a light guide plate on the light exit side of the light source plate;
   a diffuser sheet on a side of the light guide plate distal to the light source plate;
   a quantum dot film on a side of the diffuser sheet distal to the light guide plate; and
   a prism on a side of the quantum dot film distal to the diffuser sheet.

16. A display panel, comprising the backlight unit of claim 15 and a driving circuit for driving the backlight unit.

17. The display panel of claim 16, further comprising a display substrate on a light exit side of the backlight unit.

18. The display panel of claim 17, further comprising a protection frame at both sides of a U-shaped opening of the back plate having a U-shape, to fix the back plate and the display substrate.

19. The display panel of claim 18, wherein the display substrate is a liquid crystal display substrate.

20. A backlight unit, comprising the backlight assembly of claim 13 and a light adjusting layer on the light exit side of the light source plate in the backlight assembly, wherein the light adjusting layer is for adjusting light emitted from the light source plate.

\* \* \* \* \*